March 17, 1953  R. F. TATOM ET AL  2,631,648
CHAIR SHOCK MOUNT MECHANISM
Filed Feb. 28, 1948  2 SHEETS—SHEET 1
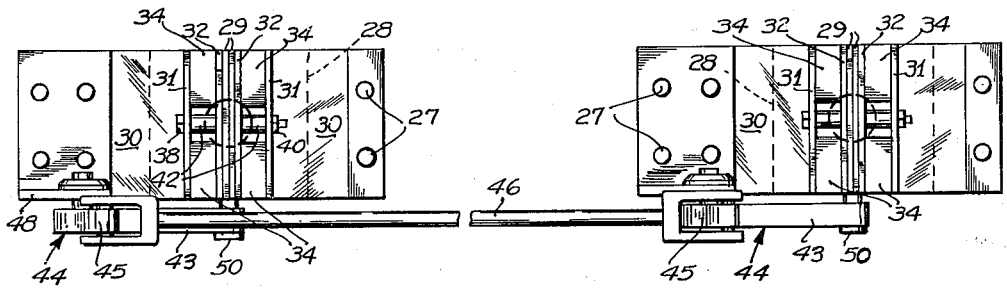
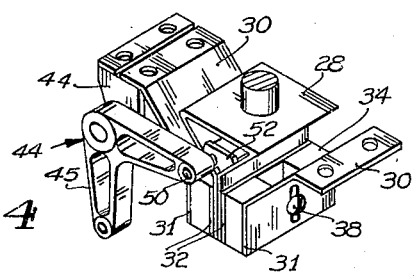
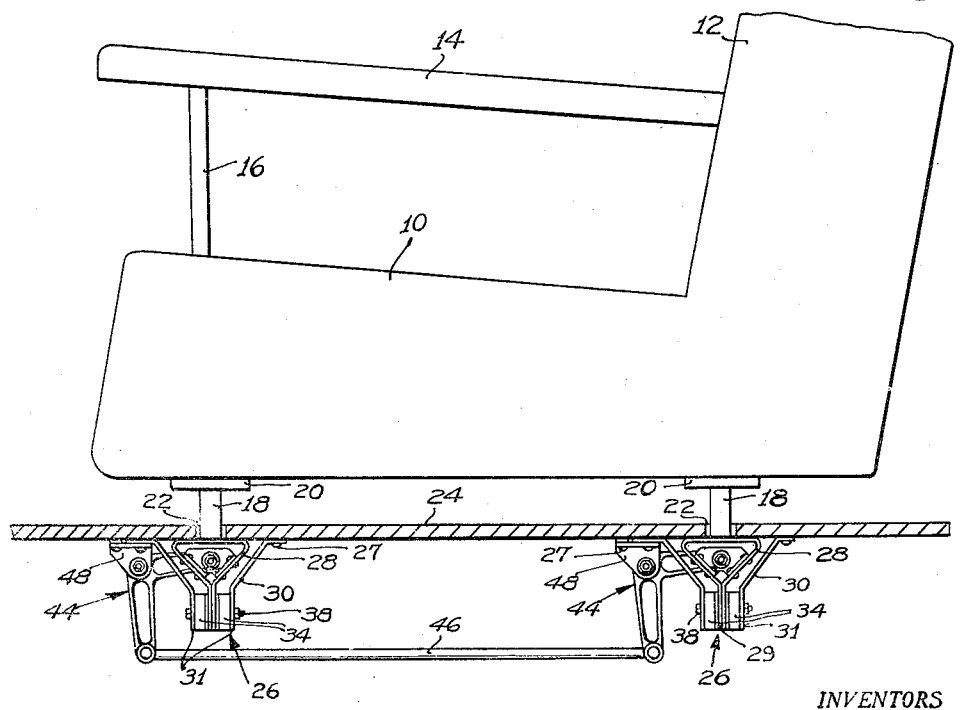
INVENTORS
RAYMOND F. TATOM
EDWARD B. KINNAMAN
BY
Reynolds + Beach
ATTORNEYS

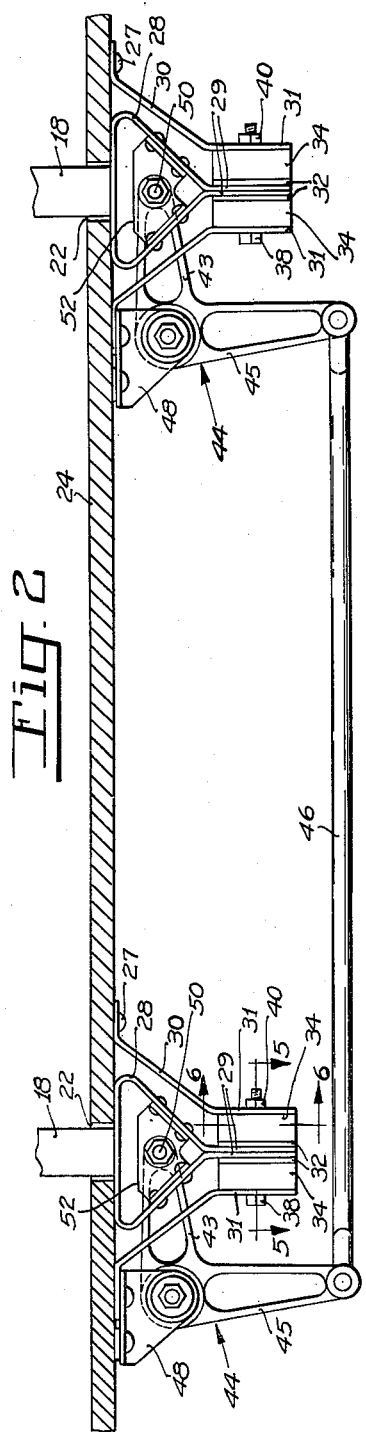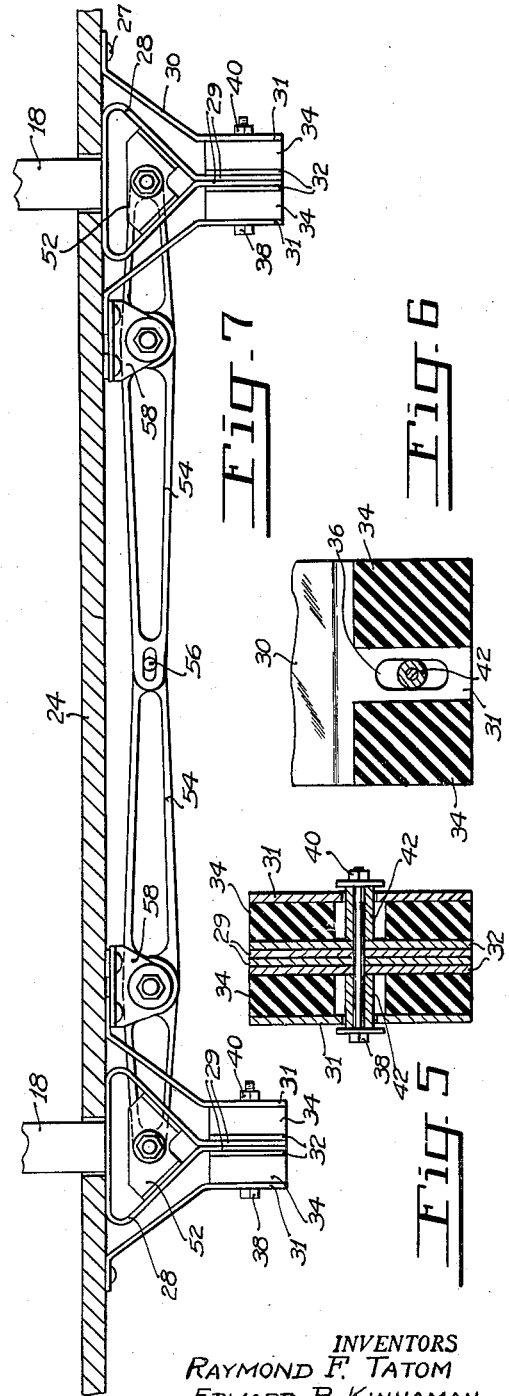

Patented Mar. 17, 1953

2,631,648

UNITED STATES PATENT OFFICE 2,631,648

CHAIR SHOCK MOUNT MECHANISM

Raymond F. Tatom, Puyallup, and Edward B. Kinnaman, Seattle, Wash., assignors to Boeing Airplane Company, Seattle, Wash., a corporation of Delaware Application February 28, 1948, Serial No. 12,064

5 Claims. (Cl. 155—9)

1

It is frequently desirable to isolate passengers of a vehicle from vibration, by use of shock-mounts for the chairs. This applies to aircraft, trains, busses, and various other transport vehicles. Apart from passenger chairs, another use of shock-mounts in their more general application is to enable heavy or delicate equipment, such as complex and heavy computing or indicating mechanisms aboard military vehicles, to be protectively mounted. The present invention is concerned with certain improvements in shock mount apparatus which may have various applications, but primarily as applied to chairs aboard passenger vehicles, such as airplanes.

It has been customary when shock-mounting chairs to support each chair leg or its equivalent by an individual shock mount unit embodying rubber or other resilient material for cushioning the chair against shock. This arrangement in an aircraft is usually dictated by consideration of overall weight and standarization or interchangeability of chairs. Much added comfort is derived from such an arrangement especially so long as the occupant remains seated normally and with his weight carried more or less equally by all of the shock mount units. The difficulty arises, however, when the occupant's weight is shifted so as to place the load predominantly on one or some of the units, others being relatively lightly loaded. The overloaded units then tend to bottom or become stiff and lose their shock-absorbing qualities. The attending differential deflection as between overloaded and underloaded units can also cause the chair to tilt uncomfortably.

Location of the shock mounts at the point of attachment of the chair leg to the air plane does not promote stability. Under certain conditions this lack of stability can cause a prolonged rocking or pitching of the chair, and can be very annoying to the passenger.

If the individual units are made stiffer to prevent excessive deflection and bottoming or rocking under the foregoing conditions, then, acting as a group, the units are excessively stiff and fail to provide the desired vibration isolation characteristics for comfort when the occupant sits naturally in the chair.

An object of this invention is to overcome the difficulties mentioned above by coordinating the action of the shock mount units so that no one of them can be overloaded excessively while the others are underloaded. Accordingly, the loads on the units, or selected ones of the units, are equalized, particularly fore and aft of the chair,

2 so that the load is shared between them. Even when the occupant's weight then overlies one of the units it will not bottom or take excessive load, because another unit is always made to carry its proportionate share of the total load. Irrespective of the occupant's position on the chair its stability is thereby assured, because over-deflection of the individual units is completely eliminated. Since the load is shared equally by fore and aft units then it also follows that rocking cannot occur and the chair is thus stable.

As an outgrowth of the achievement of the foregoing object, all of the units may be designed for optimum performance and need not be overly stiff, as formerly was necessary to prevent rocking and instability of the chair as the weight of the occupant was shifted. Since each of the coordinated units always carries its substantially fixed share of the total load applied to the chair, the units may be designed to afford the best shock insulating properties of the mounting as a whole which are realized under all positions and postures of the chair's occupant.

Another object of the invention is to provide improved shock-mount means for chairs or for similar objects in which the shock mount apparatus may be mounted compactly and securely beneath the floor over which the chairs are supported, and engageable by the chair legs depending from the chair sliding through apertures in the floor. The shock mounting apparatus therefore has no projecting or obtrusive parts above the floor.

The principal feature of the invention resides in shock mount apparatus including individual shock mount units carrying the individual chair legs or their equivalent chair supports, and coordinating mechanism interconnecting two or more of the individual shock mount and support units to equalize the load between them. In the illustrated instances the units are connected together in pairs at the sides of the chair to provide fore and aft load equalization and stability against rocking in that direction, although it will be understood that all of the shock mount units could be coordinated readily where stability is desired in all directions of rocking.

A further feature of the invention resides in special shock mount units which can be formed inexpensively from thin bar metal strips and which are particularly adapted for the more general purposes of the invention. Specific features of the invention will also be found in the different illustrated forms of coordinating or equalizing mechanism as well.

As the description proceeds with reference to the accompanying drawings, the foregoing and various other features, objects and advantages of the invention will become apparent as will the various possibilities for modifying the details of its illustrated forms to produce varying effects or to apply the invention to shock mounting objects other than chairs.

Figure 1 is a side elevation view of a chair shock-mounted in accordance with the practice of the invention, and illustrating one form of coordinating or equalizing mechanism associated with the shock mount units; Figure 2 is an enlarged side elevation view of the shock mount structure alone, showing its manner of attachment to the floor of the vehicle; Figure 3 is a corresponding bottom view of the same.

Figure 4 is a perspective view of an individual shock mount unit and a connecting portion of the foregoing equalizing mechanism; Figure 5 is a detail sectional view of a portion of the shock mount unit, showing the rubber sections constituting the shock absorbing cushions, the view being taken along section line 5—5 of Figure 2; Figure 6 is a corresponding cross-sectional view taken along section line 6—6 of Figure 2 in a plane at right angles to that of Figure 5.

Figure 7 is a side elevation view of a modified form of coordinating or equalizing mechanism interconnecting individual shock mount units.

The typical chair illustrated comprises a seat 10, a back 12, side arms 14 and armposts 16, in addition to four chair supports in the form of short tubular legs 18, anchored in supporting flanges 20 secured to the seat bottom, and projecting downwardly through apertures 22 in the floor 24. Through each such aperture in the floor a chair leg 18 is given footing upon the floating pedestal element 28 of an individual shock mount unit 26 having a base 30 rigidly secured by rivets or bolts 27 to the under side of the floor, or to another suitable support. Each leg is anchored in suitable manner to its floating pedestal element 28 and is thus shock-insulated from the unit's base 30 which is fastened to the floor.

Conveniently, the base 30 may comprise a pair of strip metal brackets whose upper ends are riveted or bolted to the floor on either side of a floor aperture 22. From their points of connection to the floor the brackets converge downwardly a predetermined distance to lower end portions bent to form spaced parallel tabs 31. Similarly, the floating pedestal element 28 is formed of strip material, shaped approximately as a triangular loop disposed with its base up and serving as the pedestal for the chair leg. The sides converge downward corresponding to the convergence of the mounting base bracket sides. Tabs 29 at the apex of the triangular pedestal loop project downward and are joined in face to face contact. These tabs lie approximately mid-way between the tabs 31 of the base 30 and are clamped sandwich-fashion between metal plates 32 bonded to rubber pads 34, also bonded to the tabs 31 of the base bracket 30. These rubber pads thus are stressed in shear to provide resilient support for the floating pedestal element 28 supporting each chair leg.

The tabs 29 of the floating pedestal element held between the rubber pads are apertured to receive closely the clamp bolt 38, and the bracket tabs 31 opposite them are apertured centrally at 36 between the opposing edges of the paired rubber pads 34. The clamp bolt 38 extending between the pads in each pair is secured by a nut 40 as shown in Figure 5. Spacer sleeves 42 separate the washers of bolt 38 adjacent to the brackets 30 a predetermined distance from the plates 32 to prevent excessive pre-compression of the rubber pads which would distort them and render them inefficient. The bolt apertures in the brackets are elongated vertically to enable the bolt to rise and fall with the floating pedestal, whereas the apertures in the plates 32 and in the tabs 29 are circular, whereby the bolt prevents relative vertical displacement between plates 32 and the pedestal. It is not necessary to press the rubber pads and metal into gripping contact in order to place the rubber in shear by load applied to the pedestal and carried directly only by the rubber, since the rubber pads do not rely upon the clamping action of the bolt to hold them in place and cause them to grip the adjoining metal faces of the spaced brackets and the plates 32. Instead they are suitably bonded to the metal in any well known manner for bonding rubber to steel or other metal.

Each shock mount unit sustains a load made up of two components, one being the force applied to it directly by the chair leg 18 which it supports, and the other comprising an equalizing component applied by the equalizing mechanism. The latter component will be positive in one of two interconnected shock mounts and of equal, but negative value in the other of such shock mounts. The algebraic sum of the two components for each of the units which are interconnected is the same, although that sum may vary as the weight on the chair varies, and although the magnitudes of the components for each unit may fluctuate in their relative proportions as the chair occupant shifts his position. In thus equalizing the stresses in the two shock mounts the floating pedestal elements of interconnected units are also displaced in unison with changes in total load on the chair carried by such units, irrespective of the distribution or location of the center of loading on the chair.

As illustrated, the individual shock mount units are oriented with the horizontal edges of their base bracket tabs 31 and floating pedestal element tabs 29 extending in a direction generally transversely of the chair, although this is primarily a matter of convenience in connecting the illustrated equalizing mechanism to them. In Figures 1 to 3, inclusive, the coordinating or equalizing mechanism interconnects the shock mount units only in pairs at the sides of the chair, and does not coordinate the action as between opposite sides of the chair, although, as explained previously, such an arrangement would be possible wherever it appeared desirable to do so. Any number of such shock units, all interconnected, may be arranged along each side of the chair, or a single resilient element only may be connected to both front and rear leg supports of the chair, or to the equalizing mechanism.

As it is illustrated, the arrangement is designed only to prevent fore and aft rocking or unstable tilting of the chair. A preferred equalizing or coordinating mechanism for achieving this comprises individual bell cranks 44 connected for rotation positively by load displacement of their respective units, the bell cranks of each pair being interconnected for conjoint rotation by a link 46. The bell cranks 44 are rotatable about transverse axes and supported by mounting lugs 48 secured to the floor generally in front of the chair leg locations. Each crank includes a laterally extending arm 43 pivotally connected to a shock mount pedestal element, and an arm 45 at an angle to the first arm, preferably extending downwardly from the crank's hub, and it may be equal in length to the first arm. The ends of corresponding arms 45 are connected pivotally to the opposite ends of a connecting link 46. The pivotal connection of lateral arms 43 with the pedestal elements is by pins 50 journaled in the ends of the arms and in lugs 52 made fast to the floating elements within their loops.

Whenever a greater load is applied to one of the chair legs than to others, tending toward increased downward displacement of the associated shock mount floating element, the lateral arm of the bell crank lever connected to such element is swung downwardly a corresponding amount, swinging correspondingly its vertical arm, which shifts endwise the link 46 connected to it. Thereby the upright arm of the other bell crank lever connected to such link is swung correspondingly, producing a like downward swinging of its lateral arm and consequent displacement of the floating element of the coordinated shock mount unit connected to such arm. To compensate for the arcuate characteristic of the motion of the ends of arms 43, whereas the connected floating elements tend to move linearly vertically, the ends of the arms may be slotted longitudinally to receive pins 50, or some other equivalent arrangement may be used.

In order to cause all four of the shock mount units supporting the illustrated chair to be displaced conjointly, were this desired, it would only be necessary to extend a shaft crosswise of the chair between corresponding bell crank levers, either at the front or back of the chair, to form a common journal for them compelling them to rock conjointly and equally, thus coordinating all the levers to swing in unison. By this expedient the chair would be restrained not only from rocking fore and aft, but also from tilting sidewise. As previously stated such an arrangement is not ordinarily contemplated or necessary since there is comparatively little tendency for a chair to tilt sidewise. Also, a certain restraint against lateral tilting is afforded by the cranks themselves by virtue of their pivot supports and pivot connections to the pedestals being rotatable only about parallel horizontal axes.

Since the interconnected units will be deflected equally, and contribute equally to support of the load, no one of the units need be designed to take a major portion of the chair load at any time, and each can be of proportionately reduced maximum capacity, and therefore of reduced size and cost. A primary advantage is the improved over-all performance of a chair thus mounted. Not only is it more stable, as described, but the shock mount qualities are also greatly improved, since the range of loading of each individual unit will be proportionately smaller when the units are coordinated than when they act separately, and no one of them can be relatively overloaded.

Another convenient form of coordinating or equalizing lever mechanism is illustrated in Figure 7, wherein the bell crank type levers 44 and connecting links 46 in the previous form are replaced by a straight lever system interconnecting the pairs of shock mount floating elements. Such lever system comprises at least two straight levers 54 pivoted about fixed supports between their ends. The levers are approximately aligned, with their inner, adjoining arms connected by a pin 56 for conjoint swinging in opposite senses. Such pin is received in slots in the inner arms of the levers, as shown, or other means are provided to permit slight relative endwise displacement attending swinging. The outer, oppositely extending arms of such levers are pivoted respectively to the shock mount elements of a pair. Since the pivot supports 58 of the levers 54 are located in each instance on the side of the adjoining shock mount unit toward the corresponding coacting unit of the pair, the floating elements of such coacting units will be compelled to react in unison under load, as desired. The members connecting the levers to the floating pedestal elements may be the same as in the previous form.

It will be observed that, in some instances, this latter arrangement may be preferred to that of Figures 1 to 3, inclusive, because of the reduction in vertical space required for the mechanism beneath the floor, although it may require somewhat more rugged construction because of the increased lengths of the lever arms required for them to span the distance together, between the shock mount units which they connect. In the first arrangement the link or rod 46 spans the required distance and the bell crank arms may be comparatively short.

Both of the illustrated lever mechanisms could be replaced by still different mechanisms to effect the same general operation. Thus, the individual units could be equalized by other devices interconnecting such units, so that vertical movement of one would effect a corresponding movement of the other.

It will be evident from the description that the invention as applied to a chair aboard an aircraft, train, bus, or other vehicle, while it affords the desired degree of shock insulation, inhibits rocking motions and instability. For example, it will afford a considerable reduction in tendencies for the chairs to oscillate back and forth involuntarily at various critical vibration frequencies, such as from unevenness in a railroad bed, or the like. Pitching of an aircraft in rough air will have less effect upon a passenger's discomfort by the use of such mechanism.

It is possible that under certain design conditions it might be desirable to isolate the chair and passenger from pitching or rocking vibrations originating in the floor. With our construction, for example, a selected degree of isolation from such vibrations can be obtained by making the connecting link 46 of a material or construction by which it is somewhat yieldable or elastic lengthwise to compression and tension forces. Other means might also be employed permitting limited relative vertical displacement of the coordinated shock mount units to allow limited fore and aft motion of the chair.

It should be understood that the invention may be applied in other instances where coordinated shock absorbing action is desired in accordance with the principles herein set forth, and furthermore that various other suitable mechanisms could be employed for the individual shock mount units, as well as for the mechanism coordinating their displacement.

We claim as our invention:

1. In combination, a generally horizontal supporting structure, a plurality of vertical legs adapted to carry a load above said structure, said legs projecting movably through separate apertures in said structure to the underside thereof, and individual shock mount units located beneath said structure and operatively supporting the projecting ends of said legs therefrom, said units individually comprising a pair of support members mounted in spaced relation connected rigidly to the underside of said structure at either side of an aperture therein, a pedestal element carrying the end of the leg projecting through such aperture and guided for vertical movement between said support members, and resiliently yieldable shock-isolating support means interposed between the pedestal element and said support members to transfer the load of such leg from the pedestal element to the support members through the medium of said shock-isolating support means.

2. The combination defined in claim 1, in which the support members comprise bar metal brackets fixedly mounted at their upper ends to the underside of the supporting structure, mutually converging downwardly for a predetermined distance and terminating in downwardly projecting, mutually spaced, parallel tabs, and in which the pedestal element of each shock mount unit comprises a bar metal loop tapered downwardly in approximate conformity with the convergence of the support member brackets, and having downwardly projecting free ends forming tabs pinched together and extending downwardly into the space between the parallel tabs of said brackets, the upper side of said loop constituting a pedestal support surface for a leg, and further wherein the shock-isolating support means includes rubber pads secured to and between the tabs of said pedestal element loop and the tabs of said brackets to load the rubber in shear by the weight of a leg resting on said support pedestal.

3. The combination defined in claim 1, and shock mount coordinating mechanism comprising separate members supported pivotally from the underside of the supporting structure and individually connected to a different shock mount unit pedestal element, to be swung about its pivotal support by vertical displacement of such element, and means interconnecting at least two of such members to cause one such member to swing conjointly with the other, and thereby to produce conjoint displacement of their respective pedestal elements.

4. The combination defined in claim 2, and shock mount coordinating mechanism comprising separate lever members supported pivotally from the underside of the supporting structure, each having one arm pivotally connected by its swinging end to a different shock mount unit pedestal element, to be swung about its pivotal support by vertical displacement of such pedestal element, and having a second arm swingable therewith, and means interconnecting the swingable second arms of at least two of such lever members to cause one such member to swing conjointly with the other, and thereby to produce conjoint displacement of their respective pedestal elements.

5. In combination, a load support having a plurality of legs, a supporting surface beneath said support having apertures therein through which said support legs respectively project downwardly, and shock mount mechanism located substantially wholly beneath said surface, comprising individual pedestal elements each carrying one of said chair legs, means guiding said pedestal elements for substantially vertical movement relative to said supporting surface, movement coordinating means mounted upon the underside of said supporting surface and operatively interconnecting at least two of said pedestal elements to cause one to move conjointly with the other, relative to said supporting surface, and resiliently yieldable shock-isolating means having a stationary portion fixed to the supporting surface and a movable portion operatively connected to a pedestal element to oppose resiliently depression thereof under chair load.

RAYMOND F. TATOM.
EDWARD B. KINNAMAN.

REFERENCES CITED

The following references are of record in the file of this patent:

UNITED STATES PATENTS

| Number | Name | Date |
|---|---|---|
| 140,571 | Benedict | July 8, 1873 |
| 522,142 | Barrett | June 26, 1894 |
| 564,199 | Housman | July 21, 1896 |

FOREIGN PATENTS

| Number | Country | Date |
|---|---|---|
| 360,979 | France | May 9, 1906 |
| 692,153 | France | July 29, 1930 |
| 241,462 | Great Britain | Oct. 22, 1925 |